United States Patent [19]
Metzger et al.

[11] 3,873,299
[45] Mar. 25, 1975

[54] 1,2,4-THIODIAZOLYL-UREA HERBICIDAL AGENTS

[75] Inventors: Carl Metzger; Dieter Borrmann, both of Wuppertal-Elberfeld; Richard Wegler, Leverkusen; Ludwig Eue, Cologne-Stammheim; Helmuth Hack, Cologne-Buchheim, all of Germany

[73] Assignee: Farbenfabriken Bayer Aktiengesellschaft, Leverkusen, Germany

[22] Filed: June 16, 1972

[21] Appl. No.: 263,488

Related U.S. Application Data

[60] Division of Ser. No. 862,908, Oct. 1, 1969, Pat. No. 3,686,198, which is a continuation-in-part of Ser. No. 756,296, Aug. 29, 1968, abandoned.

[30] Foreign Application Priority Data

Sept. 19, 1967 Germany.................................. 53530

[52] U.S. Cl. ................................................ 71/90
[51] Int. Cl............................................... A01n 9/12
[58] Field of Search ........................................ 71/90

[56] References Cited
UNITED STATES PATENTS

| | | | |
|---|---|---|---|
| 3,159,644 | 12/1964 | Stephens................................. | 71/90 |
| 3,260,588 | 7/1966 | Schroeder............................... | 71/90 |
| 3,454,591 | 7/1969 | Schulz et al. ........................... | 71/90 |
| 3,551,442 | 12/1970 | Guillot et al........................... | 71/90 |
| 3,622,593 | 11/1971 | Volpp .................................... | 71/90 |

OTHER PUBLICATIONS

Shoeb et al., "Possible Oral Hypoglycenic Agents," (1963) CA59, pp. 7532–7533, (1963).

Ermili et al., "Chem. & Pharm. Studies on Ureas Etc.," (1967) CA68, No. 2863 m. (1968).

*Primary Examiner*—Glennon H. Hollrah
*Attorney, Agent, or Firm*—Burgess, Dinklage & Sprung

[57] ABSTRACT

N-[3-(alkyl, alkylmercapto, dialkylamino and phenyl-substituted)-1,2,4-thiadiazol-5-yl]-N-[unsubstituted and alkyl-substituted]-N',N'-[mono- and di- -alkyl-substituted] ureas which possess herbicidal properties, and which may be produced by conventional methods.

11 Claims, No Drawings

1,2,4-THIODIAZOLYL-UREA HERBICIDAL AGENTS

This is a division, of application Ser. No. 862,908 filed Oct. 1, 1969, now U.S. Pat. 3,686,198 which in turn is a Continuation-in-Part Application of copending U.S. Application, Ser. No. 756,296, filed Aug. 29, 1968, now abandoned.

The present invention relates to and has for its objects the provision for particular new 1,2,4-thiadiazolyl ureas, i.e. N-[3-(alkyl, alkylmercapto, dialkylamino and phenyl-substituted)-1,2,4-thiadiazol-5-yl]-N-[unsubstituted and alkyl-substituted]-N', N'-[mono- and di- -alkyl-substituted] ureas, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that thiazolyl ureas, such as N-(4-methyl-1,3-thiazol-2-yl)-N'-methyl urea (A), can be used as herbicides (see Belgian Pat. No. 679,138).

It has now been found, in accordance with the present invention, that the particular new 1,2,4-thiadiazolyl ureas having the general formula.

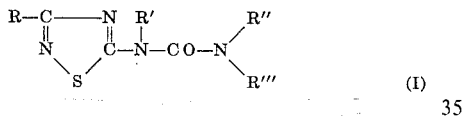

(I)

in which
R is selected from the group consisting of alkyl having 1–4 carbon atoms, alkylmercapto having 1–4 carbon atoms, di-alkyl-amino having 1–4 carbon atoms in each alkyl moiety and phenyl,
R' is selected from the group consisting of hydrogen and alkyl having 1–4 carbon atoms,
R'' is selected from the group consisting of hydrogen and alkyl having 1–4 carbon atoms, and
R''' is alkyl having 1–4 carbon atoms, exhibit strong herbicidal, in particular selective herbicidal, properties.

Analogous carboxylic acid (1,2,4-thiadiazol-5-yl)-amides having particularly effective, especially selective, herbicidal activity are disclosed and claimed in copending U.S. Application Ser. No. 756,310, filed Aug. 29, 1968 now U.S. Pat. No. 3,629,275, whereas analogous N-substituted 5-amino-1,3,4-thiadiazoles having particularly effective, especially selective, herbicidal activity, are disclosed and claimed in copending U.S. Application Ser. No. 756,284, also filed Aug. 29, 1968.

The present invention also provides a process for the production of a 1,2,4-thiadiazolyl urea of formula (I) above in which
a. a 5-aminothiadiazole of the formula:

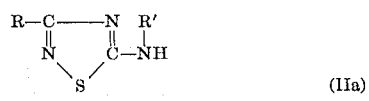

(IIa)

in which

R and R' are the same as defined above is reacted, in the presence of a solvent, with an isocyanate of the formula:

$$R''' - N = C = O$$

(IIb)

in which
R''' is the same as defined above, or
b. a 5-aminothiadiazole of formula (IIa) is reacted, in the presence of a solvent and an acid binder, with an acid chloride of the formula:

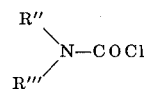

(IIc)

in which
R'' and R''' are the same as defined above, or
c. a urethane of the formula:

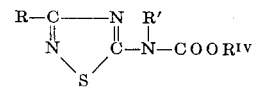

(IId)

in which
R and R' are the same as defined above, and R'' is a methyl or phenyl radical is reacted with an amine of the formula:

(IIe)

in which
R'' and R''' are the same as defined above.

It is very surprising that the 1,2,4-thiadiazolyl ureas according to the present invention have a stronger herbicidal activity and a better selective herbicidal activity than the previously known thiazolyl ureas.

If methyl isocyanate and 3-phenyl-5-amino-1,2,4-thiadiazole are used as reactants, the reaction according to [a] can be represented by the following formula scheme:

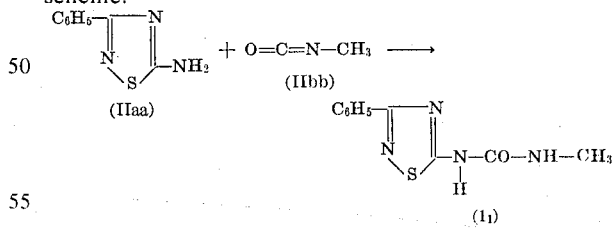

If 3-phenyl-5-amino-1,2,4-thiadizaole and dimethylcarbamic acid chloride are used as starting materials, the reaction according to [b] can be represented by the following formula scheme:

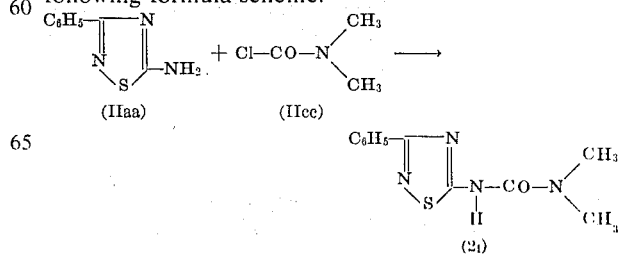

If 3-phenyl-1,2,4-thiadiazole-5-carbamic acid methyl ester and methyl amine are used as starting materials, the reaction according to [c] can be represented by the following reaction scheme:

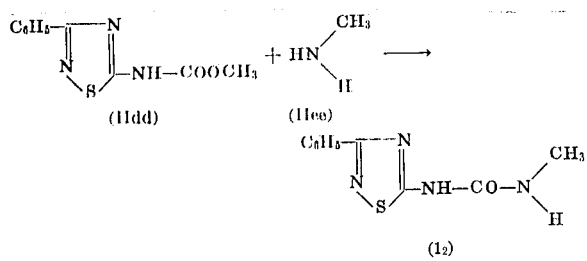

Advantageously, in accordance with the present invention, in the various formulae herein:

R represents
  alkyl having 1-4 carbon atoms, such as methyl, ethyl, n- and iso-propyl, n-, iso-, sec.- and tert.-butyl, and the like, especially methyl, ethyl, n- and iso-propyl, and particularly $C_{1-3}$ alkyl; or
  alkylmercapto having 1-4 carbon atoms, such as methyl to tert.-butyl inclusive, as defined above, and the like, -mercapto, especially $C_{1-2}$ alkylmercapto, and preferably methyl-mercapto; or
  di-alkylamino having 1-4 carbon atoms in each alkyl moiety, such as di- methyl to tert.-butyl inclusive, as defined above, and the like, -amino, including mixed methyl- with -ethyl, -n-propyl, -isopropyl, -n-butyl, -isobutyl, -sec.-butyl, -tert.-butyl; ethyl- with -n-propyl, -isopropyl, -n-butyl, -isobutyl, -sec.-butyl, -tert.-butyl; n-propyl- with -isopropyl, -n-butyl, -isobutyl, -sec.-butyl, -tert.-butyl; isopropyl- with -n-butyl, -isobutyl, -sec.-butyl, -tert.-butyl; n-butyl- with -isobutyl, -sec.-butyl, -tert.-butyl; isobutyl- with -sec.-butyl, -tert.-butyl; sec.-butyl- with tert.-butyl, etc., and the like, -amino especially di-$C_{1-2}$ alkyl-amino, more especially where both alkyl moieties are the same, and particularly dimethylamino; or phenyl;

R' represents
  hydrogen; or alkyl having 1-4 carbon atoms, such as methyl to tert.-butyl inclusive, as defined above, and the like, especially $C_{1-2}$ alkyl, and particularly methyl;

R" represents
  hydrogen; or
  alkyl having 1-4 carbon atoms, such as methyl to tert.-butyl inclusive, as defined above, and the like, especially $C_{1-2}$ alkyl, and particularly methyl; and R''' represents
  alkyl having 1-4 carbon atoms, such as methyl to tert.-butyl inclusive, as defined above, and the like, especially $C_{1-3}$ alkyl, and particularly methyl.

In accordance with a particular feature of the present invention, R represents $C_{1-4}$, especially $C_{1-3}$, alkyl, or phenyl; R' represents hydrogen or $C_{1-4}$, especially $C_{1-2}$, alkyl; R" represents hydrogen or $C_{1-4}$, especially $C_{1-2}$, alkyl, and preferably hydrogen and $C_{1-2}$ alkyl; and R''' represents $C_{1-4}$, especially $C_{1-3}$, alkyl.

The starting materials of formulae (IIa), (IIb), (IIc) and (IIe) above are already known.

The starting materials of formula (IId) above have not hitherto been known but they can be prepared by the usual methods for the preparation of urethane from the thiadiazolyl amines of formula (IIa), for example by reaction with chloroformic acid esters in the presence of inert organic solvents, such as benzene, and acid binders, such as trimethyl amine and pyridine, at temperatures between about 0°C and 40°C.

The term solvent as used herein includes mere diluents. All inert organic solvents are suitable for the process variants [a], [b] and [c]. Preferred solvents include hydrocarbons, such as benzene and toluene; ethers, such as diethyl ether, tetrahydrofuran and dioxan; ketones, such as acetone; esters, such as ethyl acetate; and polar solvents, such as dimethyl formamide and acetonitrile.

As acid binders, all customary acid-binding agents can be used. Preferred acid binding agents include alkali metal hydroxides, such as sodium hydroxide and potassium hydroxide, as well as alkali metal carbonates, such as potassium carbonate. Particularly suitable are tertiary amines, such as pyridine and triethyl amine.

The reaction temperatures can be varied within a fairly wide range. In general, the reaction is carried out at substantially between about 0°–120°C, and preferably between about 10–120°C.

When carrying out the process of the invention, equimolar amounts of starting materials are expediently used. In process variants [a] and [b], the most favourable temperature is about 10°–80°C; in process variant [c] it is about 80°–120°C. Moreover, here the reaction is carried out expediently under pressure. As solvent in this case a fairly large excess of amine can also be used. The working up of the reaction mixture may be carried out in the usual manner.

Advantageously, the active compounds according to the present invention influence plant growth and can therefore be used as defoliating agents and weedkillers to facilitate harvest. The instant compounds are, however, quite particularly suitable for the control of weeds. By weeds are meant in the widest sense all plants which grow in places where they are not desired. Whether the active compounds according to the present invention act as total or selective herbicides depends essentially on the amount applied as the artisan will appreciate.

The active compounds according to the present invention can be used, for example, in the case of the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettles (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Fustuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The active compounds according to the instant invention can be utilized, if desired, in the form of the usual formulations or compositions with conventional inert (i.e. plant compatible or herbicidally inert) pesticidal diluents or extenders, i.e., diluents or extenders of the type usable in conventional pesticidal formulations or compositions, e.g. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby for example, in the case where water is used as diluent, organic solvents may be added as auxiliary solvents. The following may be chiefly considered for use as carrier vehicles for this purpose: dispersible liquid diluent carriers including inert organic solvents such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g., ethanolamine, etc.), amides (e.g. dimethyl formamide, etc.), sulfoxides (e.g. dimethyl sulfoxide, etc.) ketones (e.g., acetone, etc.), and/or water; as well as dispersible finely divided solid carriers, such as ground natural minerals (e.g., kaolins, alumina, silica, chalk, i.e., calcium carbonate, talc, kieselguhr, etc.), and ground synthetic minerals (e.g., highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application of field application generally contemplate those in which the active compound is present in an amount substantially between about 0.01–10 percent, preferably 0.02–5 percent, by weight of the mixture. Thus, the present invention contemplates over-all compositions which comprise mixtures of a dispersible carrier vehicle such as (1) a dispersible carrier solid and/or (2) a dispersible carrier liquid such as an inert organic solvent and/or water preferably including a surface active effective amount of a conventional pesticide carrier vehicle assistant, e.g., a surface-active agent, such as an emulsifying agent and/or a dispersing agent, and an amount of the active compound which is effective for the purpose in question and which is generally between about 0.01–95 percent by weight of the mixture.

While the active compounds can be used according to the pre-emergence method, they are also effective when used according to the post-emergence method, i.e. both before and after the emergence of the plants.

In general, the amounts of the active compound actually applied are substantially between about 0.25–50 or 0.3–40 or 0.3–20 or 0.3–10 or 1–20 Kg/hectare, and preferably between about 0.3–10 or 2–10 Kg/hectare, apart from any carrier vehicle which may also be present.

The active compounds can also be used in accordance with the well known ultar-low-volume process with good success, i.e., by applying such compound if normally a liquid, or by applying a liquid composition containing the same, via very effective atomizing equipment in extremely finely divided form, i.e., mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95 percent by weight of active compound or even the 100 percent active substance alone, e.g. about 40–100 percent by weight of the active compound.

Furthermore, the present invention contemplates methods of selectively controlling or combatting undesired plants, e.g., weeds and the like, and/or of defoliating plants, which comprise applying to at least one of (a) such weeds, plants, etc. and (b) their habitat, i.e., the locus to be protected, a herbicidally effective, or defoliating, amount of the particular active compound of the invention alone or together with a carrier vehicle as noted above. The instant formulations or compositions are applied in the usual manner, for example, by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. selective or total herbicide, and the plants which are to be controlled or protected. Therefore, in special cases, it is possible to go above or below the aforementioned concentration ranges and amounts/hectare.

The following Examples illustrate, without limitation, the herbicidal activity of the particular active compounds of the present invention.

Example 1

Pre-emergence Test
Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is then added and the resulting concentrate is diluted with water to the desired final concentration.

Seeds of the test plants are sown in normal soil and, after 24 hours, watered with the preparation of the given active compound. It is expedient to keep constant the amount of water per unit area. The active compound concentration in the preparation is of no importance, only the amount of active compound applied per unit area being decisive. After three weeks, the degree of damage to the test plants is determined and characterized by the values 0–5, which have the following meaning:

0. no effect Solvent: 1
1. slight damage or delay in growth
2. marked damage or inhibition of growth
3. heavy damage and only deficient development or only 50 percent emerged
4. plants partially destroyed after germination or only 25 percent emerged
5. plants completely dead or not emerged.

The particular active compounds tested, the amounts applied and the results obtained can be seen from the following Table 1.

Example 2

Post-emergence test
Solvent:     5 parts by weight acetone
Emulsifier:  1 part by weight alkylaryl polyglycol ether To produce a suitable preparation of the particular active compound, 1 part by weight of such active compound is mixed with the stated amount of solvent, the stated amount of emulsifier is then added and the resulting concentrate is diluted with water to the desired final concentration.

Test plants which have a height of about 5–15 cm. are sprayed with the given active compound preparation until just dew moist. After three weeks, the degree of damage to the plants is determined and characterized by the values 0–5, which have the following meaning:

0. no effect

TABLE 1

[Pre-emergence test]

| Active compound | | Active compound applied in kg./hectare | Echino-chloa | Cheno-podium | Sinapis | Oats | Cotton | Wheat |
|---|---|---|---|---|---|---|---|---|
| (A) | $CH_3-C\underset{N}{\overset{CH-S}{\diagup\diagdown}}C-NH-\underset{O}{\overset{\|}{C}}-NH-CH_3$ (known) | 40<br>20<br>10<br>5<br>2.5 | 4–5<br>4<br>4<br>3<br>2 | 5<br>5<br>5<br>4<br>2–3 | 5<br>5<br>4<br>2–3<br>1 | 4<br>4<br>3–4<br>3<br>2 | 4<br>4<br>3<br>1<br>0 | 4–5<br>4<br>4<br>3<br>1 |
| (3₁) | $CH_3-CH\underset{CH_3}{\vert}\underset{N}{\overset{\phantom{x}}{\diagup}}\overset{N}{\underset{S}{\diagdown}}\underset{CO-NH-CH_3}{\overset{CH_3}{\diagup}N}$ | 40<br>10<br>5<br>2.5<br>1.25 | 5<br>5<br>5<br>5<br>4 | 5<br>5<br>5<br>5<br>5 | 5<br>5<br>5<br>5<br>5 | 5<br>5<br>5<br>4–5<br>4 | 5<br>5<br>2<br>1<br>0 | 5<br>5<br>4<br>2<br>1 |
| (4₁) | $CH_3\underset{N}{\overset{\phantom{x}}{\diagup}}\overset{N}{\underset{S}{\diagdown}}\underset{CO-NH-CH_3}{\overset{CH_3}{\diagup}N}$ | 50<br>10<br>5<br>2.5 | 5<br>5<br>5<br>4 | 5<br>5<br>5<br>5 | 5<br>5<br>5<br>5 | 5<br>5<br>5<br>5 | 5<br>4<br>3<br>2 | 4–5<br>3<br>2<br>0 |
| (5₁) | $C_2H_5\underset{N}{\overset{\phantom{x}}{\diagup}}\overset{N}{\underset{S}{\diagdown}}-NH-CO-NH-CH_3$ | 40<br>10<br>5<br>2.5 | 5<br>5<br>5<br>4 | 5<br>5<br>4<br>3 | 5<br>5<br>5<br>5 | 5<br>4–5<br>4<br>3 | 4<br>2<br>0<br>0 | 5<br>3<br>2<br>1 |
| (6₁) | $\underset{CH_3}{\overset{CH_3}{\diagdown}}CH\underset{N}{\overset{\phantom{x}}{\diagup}}\overset{N}{\underset{S}{\diagdown}}-NH-CO-NH-CH_3$ | 40<br>10<br>5<br>2.5 | 5<br>5<br>5<br>4–5 | 5<br>5<br>5<br>5 | 5<br>5<br>5<br>5 | 5<br>5<br>4–5<br>3 | 5<br>3–4<br>2<br>0 | 4<br>2<br>0<br>0 |
| (7₁) | $n\text{-}C_3H_7\underset{N}{\overset{\phantom{x}}{\diagup}}\overset{N}{\underset{S}{\diagdown}}-NH-CO-NH-CH_3$ | 40<br>10<br>5<br>2.5 | 5<br>5<br>5<br>4–5 | 5<br>5<br>5<br>5 | 5<br>5<br>5<br>5 | 5<br>5<br>4–5<br>3 | 5<br>3–4<br>2<br>0 | 4<br>2<br>0<br>0 |
| (16₁) | $i\text{-}C_3H_7\underset{N}{\overset{\phantom{x}}{\diagup}}\overset{N}{\underset{S}{\diagdown}}-\underset{\vert}{N}-CO-NH-CH_3$ ($C_2H_5$) | 1.25<br>0.625<br>0.3125 | 5<br>4<br>3 | 5<br>5<br>5 | 5<br>5<br>5 | 4<br>3<br>3 | 2<br>0<br>0 | 2<br>0<br>0 |
| (17₁) | $n\text{-}C_3H_7\underset{N}{\overset{\phantom{x}}{\diagup}}\overset{N}{\underset{S}{\diagdown}}-\underset{\vert}{N}-CO-NH-CH_3$ ($C_2H_5$) | 5<br>2.5<br>1.25<br>0.625 | 5<br>5<br>5<br>5 | 5<br>5<br>5<br>5 | 5<br>5<br>5<br>3 | 2–3<br>2–3<br>0<br>0 | 3–4<br>2<br>0<br>0 | 4<br>3<br>2<br>0 |
| (18₁) | $i\text{-}C_3H_7\underset{N}{\overset{\phantom{x}}{\diagup}}\overset{N}{\underset{S}{\diagdown}}-NH-CO-N(CH_3)_2$ | 5<br>2.5<br>1.25 | 5<br>5<br>5 | 5<br>5<br>5 | 5<br>5<br>5 | 4–5<br>4–5<br>4 | 2<br>1<br>0 | 4–5<br>4<br>3–4 |

1. a few slightly burnt spots
2. marked damage to leaves
3. some leaves and parts of stalks partially dead
4. plant partially destroyed
5. plant completely dead.

The particular active compounds tested, their concentrations and the results obtained can be seen from the following Table 2.

EXAMPLE 3 (REACTION [A])

To 17.7 g (0.1 mol) 3-phenyl-5-amino-1,2,4-thiadiazole in 60 ml acetone there are added dropwise at 20°C, with stirring, 5.7 g (0.1 mol) methyl isocyanate. After the evolution of heat has subsided, the temperature is kept at 50°C for 2 hours, and the solvent is then removed in a vacuum. After recrystallization of the solid residue from alcohol, the N-(3-phenyl-1,2,4-thiadiazol-5-yl)-N'-methyl urea (1₄) is obtained in crystalline form (see Table 3).

The other ureas mentioned in Table 3, based on Formula (1) above, are prepared in an analogous manner.

Table 3

| | R | R' | R" | R''' | m.p. °C |
|---|---|---|---|---|---|
| (1₄) | C₆H₅— | H | H | CH₃ | 197 |
| (8₁) | C₆H₅— | H | H | iso—C₃H₇— | 192 |
| (4₃) | CH₃— | CH₃— | H | CH₃— | 220 |
| (3₃) | iso—C₃H₇— | CH₃— | H | CH₃— | 124 |
| (9₁) | CH₃— | H | H | CH₃— | 256 |
| (5₃) | C₂H₅— | H | H | CH₃— | 253 |
| (7₃) | n—C₃H₇— | H | H | CH₃— | 226 |
| (6₃) | iso—C₃H₇— | H | H | CH₃— | 224 |
| (10₁) | CH₃S— | H | H | CH₃— | 145 |
| (11₁) | (CH₃)₂N— | H | H | CH₃— | 120 |
| (16₃) | iso—C₃H₇— | C₂H₅— | H | CH₃— | 135 |
| (17₃) | n—C₃H₇— | C₂H₅— | H | CH₃— | 89 |

EXAMPLE 4 (REACTION [B])

0.1 mol dimethylcarbamic acid chloride is added to 17.7 g (0.1 mol) 3-phenyl-5-amino-1,2,4-thiadiazole dissolved in 150 ml pyridine and the mixture is left to stand at room temperature for 24 hours.

Suction filtration from the pyridine hydrochloride is then effected, the pyridine solution is evaporated in a

TABLE 2
[Post-emergence test]

| Active compound | Concentration of active compound in percent | Echinochloa | Chenopodium | Sinapis | Stellaria | Urtica | Oats | Cotton | Wheat |
|---|---|---|---|---|---|---|---|---|---|
| (A) 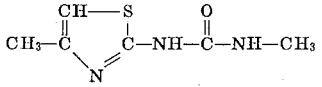 (known) | 0.2 | 5 | 5 | 5 | 5 | 5 | 2 | 3 | 2 |
| | 0.1 | 4 | 5 | 5 | 4-5 | 3 | 1-2 | 2-3 | 1-2 |
| | 0.05 | 3 | 4-5 | 4-5 | 3 | 1 | 1 | 2 | 1 |
| | 0.025 | 1 | 3 | 4 | 2 | 0 | 0 | 0 | 0 |
| (1₃) 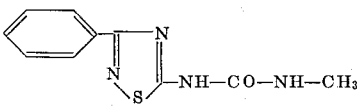 | 0.2 | 5 | 5 | 5 | 5 | 5 | 3 | 1 | 1 |
| | 0.1 | 5 | 5 | 5 | 5 | 5 | 3 | 0 | 0 |
| | 0.05 | 5 | 5 | 5 | 5 | 5 | 2 | 0 | 0 |
| | 0.025 | 5 | 4 | 5 | 4 | 4 | 0 | 0 | 0 |
| (3₂) 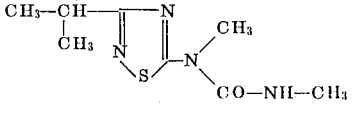 | 0.2 | 5 | 5 | 5 | 5 | 5 | 5 | 5 | 5 |
| | 0.1 | 5 | 5 | 5 | 5 | 5 | 4 | 4 | 4 |
| | 0.05 | 5 | 5 | 5 | 5 | 5 | 3 | 4 | 4 |
| | 0.025 | 5 | 5 | 5 | 5 | 5 | 0 | 3 | 2 |
| | 0.0125 | 4 | 4-5 | 5 | 5 | 5 | 0 | 1 | 0 |
| (4₂) 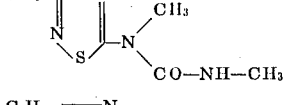 | 0.2 | 5 | 5 | 5 | 5 | 5 | 5 | 5 | 4-5 |
| | 0.1 | 5 | 5 | 5 | 5 | 5 | 3 | 4 | 2 |
| | 0.05 | 5 | 5 | 5 | 5 | 5 | 2 | 4 | 2 |
| | 0.025 | 4 | 5 | 5 | 4 | 4-5 | | 3 | 0 |
| (5₂) 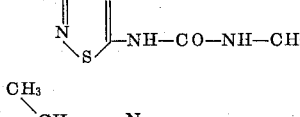 | 0.2 | 5 | 5 | 5 | 5 | 5 | 5 | 2 | 4 |
| | 0.1 | 5 | 5 | 5 | 5 | 5 | 4 | 1 | 2 |
| | 0.05 | 5 | 4 | 5 | 5 | 5 | 4 | 0 | 1 |
| | 0.025 | 3 | 3 | 5 | 5 | 5 | 2 | 0 | 0 |
| (6₂) 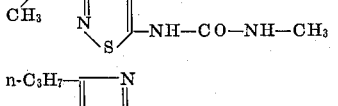 | 0.2 | 5 | 5 | 5 | 5 | 5 | 5 | 5 | 5 |
| | 0.1 | 5 | 5 | 5 | 5 | 5 | 5 | 5 | 5 |
| | 0.05 | 5 | 5 | 5 | 5 | 5 | 4-5 | 5 | 4-5 |
| | 0.025 | 5 | 5 | 5 | 5 | 5 | 4 | 5 | 4 |
| (7₂) 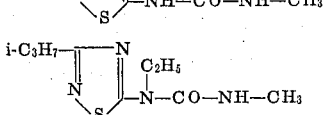 | 0.2 | 5 | 5 | 5 | 5 | 5 | 5 | 5 | 5 |
| | 0.1 | 5 | 5 | 5 | 5 | 5 | 5 | 5 | 4 |
| | 0.05 | 5 | 5 | 5 | 5 | 5 | 5 | 5 | 3 |
| | 0.025 | 4-5 | 5 | 5 | 4 | 5 | 4 | 5 | 2 |
| (16₂) 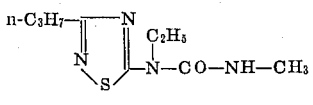 | 0.05 | 5 | 5 | 5 | 5 | 5 | 5 | 5 | 5 |
| | 0.025 | 5 | 5 | 5 | 5 | 5 | 5 | 5 | 5 |
| | 0.0125 | 4 | 5 | 5 | 5 | 5 | 4 | 4 | 4 |
| (17₂) 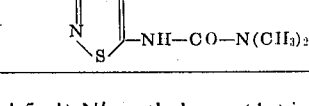 | 0.05 | 4-5 | 5 | 5 | 5 | 5 | 4 | 4 | 2 |
| | 0.025 | 4-5 | 5 | 5 | 5 | 5 | 4 | 4 | 1 |
| | 0.0125 | 2 | 5 | 5 | 5 | 5 | 2-3 | 3 | 0 |
| (18₂) 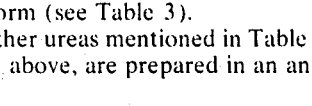 | 0.05 | 5 | 5 | 5 | 5 | 5 | 4-5 | 2 | 4-5 |
| | 0.025 | 5 | 5 | 5 | 5 | 5 | 4 | 0 | 4-5 |
| | 0.0125 | 5 | 5 | 5 | 4-5 | 5 | 3 | 0 | 2 | vacuum and the solid residue is stirred with 110 ml of 5 percent hydrochloric acid. The crude N-(3-phenyl-1,2,4-thiadiazol-5-yl)-N',N'-dimethyl urea (2₂) is filtered off with suction and recystallized from a little alcohol. m.p. 140°C.

The other ureas mentioned in Table 4, based on formula (I) above, are prepared in an analogous manner.

Table 4

| R | R' | R'' | R''' | m.p. °C |
|---|----|-----|------|---------|
| (2₂) C₆H₅— | H | CH₃— | CH₃— | 140 |
| (12₁) CH₃— | H | CH₃— | CH₃— | 102 |
| (13₁) C₂H₅— | H | CH₃— | CH₃— | 123 |
| (14₁) n—C₃H₇— | H | CH₃— | CH₃— | 89 |
| (15₁) iso—C₃H₇— | H | CH₃— | CH₃ | 75 |
| (18₁) iso—C₃H₇— | H | CH₃— | CH₃ | isolated as hydrochloride |

It will be realized by the artisan that all of the foregoing compounds contemplated by the present invention possess the desired selective or total herbicidal properties, and especially the capability of selectively destroying weeds or defoliating plants, as well as a comparatively low toxicity toward warm-blooded creatures and a concomitantly low phytotoxicity at appropriate dosages with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Method of combatting undesired vegetation which comprises applying to such vegetation or its habitat a herbicidally effective amount of a 1,2,4-thiadiazolyl urea of the formula

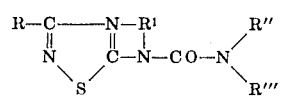

in which R is alkyl having 1-4 carbon atoms, R' is selected from the group consisting of hydrogen and alkyl having 1-4 carbon atoms, R'' is selected from the group consisting of hydrogen and alkyl having 1-4 carbon atoms, and R''' is alkyl having 1-4 carbon atoms.

2. Method according to claim 1 wherein R is alkyl having 1-4 carbon atoms, R' is selected from the group consisting of hydrogen and alkyl having 1-2 carbon atoms, R'' is selected from the group consisting of hydrogen and alkyl having 1-2 carbon atoms, and R''' is alkyl having 1-3 carbon atoms.

3. Method according to claim 1 wherein such compound is N-(3-isopropyl-1,2,4-thiadiazol-5-yl)-N-methyl-N'-methyl urea of the formula

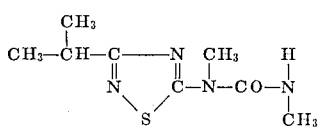

4. Method according to claim 1, wherein such compound is N-(3-methyl-1,2,4-thiadiazol-5-yl)-N-methyl-N'-methyl urea of the formula

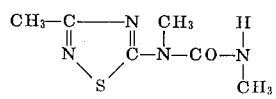

5. Method according to claim 1 wherein such compound is N-(3-ethyl-1,2,4-thiadiazol-5-yl)-N'-methyl urea of the formula

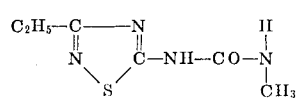

6. Method according to claim 1 wherein such compound is N-(3-isopropyl-1,2,4-thiadiazol-5-dyl)-N'-methyl urea of the formula

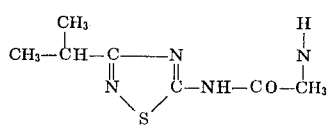

7. Method according to claim 1 wherein such compound is N-(3-n-propyl-1,2,4-thiadiazol-5-yl)-N'-methyl urea of the formula

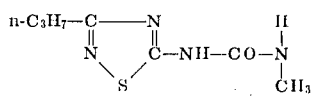

8. Method according to claim 1 wherein such compound is N-(3-isopropyl-1,2,4-thiadiazol-5-yl)-N-ethyl-N'-methyl urea of the formula

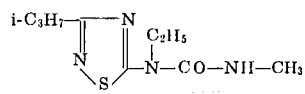

9. Method according to claim 1 wherein such compound is N-(3-n-propyl-1,2,4-thiadiazol-5-yl)-N-ethyl-N'-methyl urea of the formula

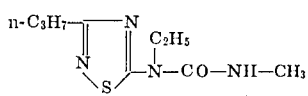

10. Method according to claim 1 wherein such compound is N-(3-isopropyl-1,2,4-thiadiazol-5-yl)-N',N'-dimethyl urea of the formula
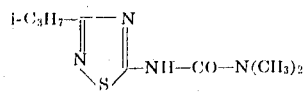
11. Method according to claim 1 wherein R is tert.-butyl.
* * * * *